United States Patent [19]

Sanders

[11] Patent Number: 5,324,143
[45] Date of Patent: Jun. 28, 1994

[54] PNEUMATIC GRAIN CONVEYOR AND RELATED METHOD

[76] Inventor: Kenneth L. Sanders, 45 Bushnell Rd., Plano, Ill. 60545

[21] Appl. No.: 10,552

[22] Filed: Jan. 28, 1993

[51] Int. Cl.⁵ ............................................. B65G 53/46
[52] U.S. Cl. .................................................. 406/67
[58] Field of Search ...................... 406/67, 63, 65, 123

[56] References Cited

U.S. PATENT DOCUMENTS

| | | | |
|---|---|---|---|
| 2,858,212 | 10/1958 | Durant et al. | 406/67 X |
| 3,171,693 | 3/1965 | Gillespie | 406/67 |
| 3,224,813 | 12/1965 | Jezo | 406/65 X |
| 3,268,266 | 8/1966 | Brown | 406/67 X |
| 3,574,411 | 4/1971 | Miller | 406/65 |
| 4,846,608 | 7/1989 | Sanders | 406/144 |

FOREIGN PATENT DOCUMENTS

| | | | |
|---|---|---|---|
| 834621 | 2/1970 | Canada | 406/63 |
| 2438071 | 2/1975 | Fed. Rep. of Germany | 406/65 |

Primary Examiner—David M. Mitchell
Assistant Examiner—Cary C. Hoge
Attorney, Agent, or Firm—Trexler, Bushnell, Giangiorgi & Blacktstone, Ltd.

[57] ABSTRACT

Method and apparatus for transferring particulate matter, such as seed, from a bulk supply to planting apparatus such as a planter or drill utilizing a pneumatic conveyer system including a lightweight, portable rotary air lock for introducing the particulate matter into the pneumatic conveying system. The system further includes a blower for pressurizing the pneumatic conveyer line and a discharge device at a remote end of the pneumatic conveyor line for delivering the seed or other particulate matter directly into the seed boxes associated with the planting apparatus. An adapter is also included for coupling the lightweight rotary air lock to a bulk supply container such that the lightweight rotary air lock is held at a predetermined angle with respect to the vertical. Fixing the angle at which the lightweight, portable rotary air lock is held with respect to the vertical promotes a substantially complete fill of the rotary air lock device, maximizes seed transfer efficiency and minimizes the risk of damage caused by shearing effects within the rotary air lock.

3 Claims, 5 Drawing Sheets

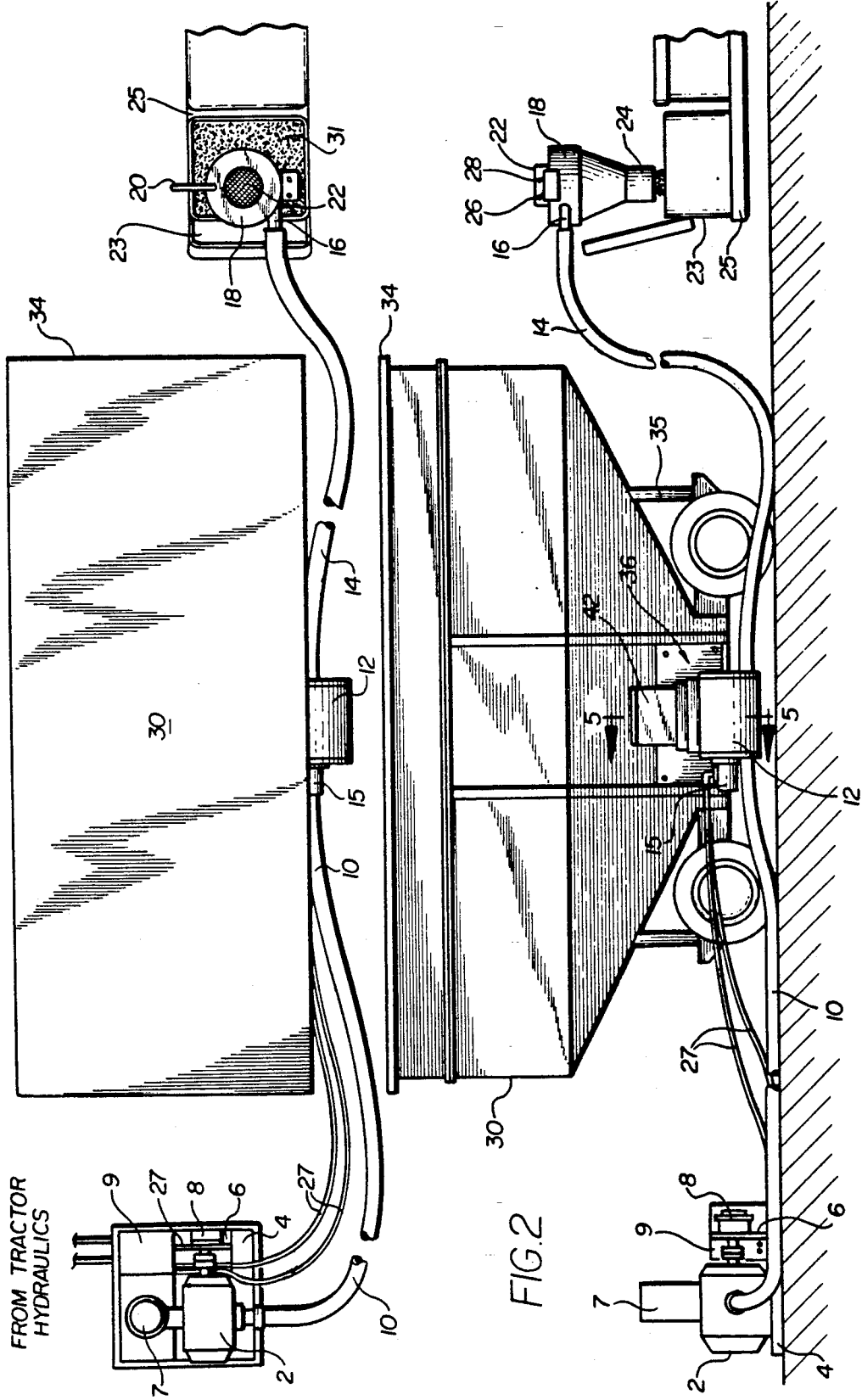

PNEUMATIC GRAIN CONVEYOR AND RELATED METHOD

BACKGROUND OF THE INVENTION a. Field of the Invention

This invention relates to improvements in pneumatic conveyors, and more particularly conveyors of the type used for transporting particulate matter, such as seed, from a bulk storage facility to a planter, drill or similar planting apparatus.

b. Description of Related Prior Art

The recent economic environment has had a dramatic effect on farmers. Minimizing labor-intensive activities and maximizing productivity has become a crucial element for survival in the farming industry.

During planting season, loading seeds into a planter or drill has always been a very labor-intensive operation. One common method for loading a planter or drill is to manually haul or dump seed contained in fifty-pound bags into seed boxes located on the planting apparatus. On each refill, a farmer will carry several bags from his pickup truck, or other storage medium, to the planter or drill. Each bag must be torn open and poured into a seed box. The time consumption and fatigue associated with this manual labor can be very significant and wasteful.

In prior years, this operation was not as much of a problem as it is today because farmers were more typically utilizing two- and four-row planters, and were farming relatively small numbers of acres. In the mechanized agricultural industry of today, however, many farmers utilize twelve- to twenty-four-row (or more) planters and/or large drills that hold forty or more bushels of seed to farm thousands of acres.

Prior art attempts at reducing the time and labor required to fill planters and drills have included providing a large, bulky rotary air lock device connected to a portable seed bin and a pneumatic seed conveyor designed to discharge seeds directly into the planter and drill seed boxes. This system, however, is difficult to handle due primarily to the weight associated with the prior art rotary air lock's metal housing and multi-vane rotor which, as a practical matter, severely limits its portability. These devices generally weigh 400 to 500 pounds. In addition, a ponderous rotary air lock device of this design can cause significant damage to the seed transferred by shearing seeds which become caught between the heavy rotor blades and housing. This, of course, can greatly reduce the seed yield and overall productivity.

Another device aimed at reducing the difficulties of loading planting apparatus with seed is disclosed and claimed in my U.S. Pat. No. 4,846,608, which is incorporated herein by reference. Instead of providing a large, heavy rotary air lock as discussed above, the '608 patent substitutes a venturi unit into a pneumatic seed conveyor connected to a large supply of seeds. The venturi unit causes the seed to be transferred from the seed supply to the pneumatic conveyor by creating a pressure differential and, ultimately, to the planter or drill boxes, as described thoroughly in the '608 patent and therefore omitted here. Although the portability of the venturi unit system represents a significant improvement over a system which includes a large, bulky rotary air lock, operation of the venturi unit system may sometimes encounter problems with unacceptable conveyor line pressure losses and seed clogging, which thereby reduces its seed transfer efficiency.

The present invention as disclosed herein meets the goals attempted by the prior art devices discussed, but does not suffer from the disadvantages mentioned, thereby providing the user of the present invention with the added benefits of greater effectiveness, portability and ease of use.

OBJECTS AND SUMMARY OF THE INVENTION

A general objective of this invention is to provide an improved conveyor of the type stated and a related method which eliminates the need for heavy and cumbersome components, without sacrificing efficiency.

Another objective of this invention is to provide a pneumatic conveyor of the type stated which uniquely utilizes an improved, lightweight rotary air lock in a pressurized pneumatic line for the purpose of efficiently metering particulate matter from a storage area with a minimal amount of damage, and introducing the particulate matter into the air line for transport to a conveyor discharge device.

A still further and important objective of this invention is to provide a lightweight rotary air lock of the type stated which is removably mounted on a storage container by means of an adapter component which dramatically increases the portability of the improved conveyor system and holds the lightweight rotary air lock in a position which promotes seed transfer and minimizes seed damage.

Generally speaking, the invention comprises a method and apparatus that utilizes air pressure to convey seed from a storage container to planter or drill seed boxes. The storage containers generally are carried on a vehicle. The system utilizes air pressure created by a positive displacement blower located at one end of a flexible pneumatic line and driven by a hydraulic motor. A lightweight rotary air lock and adapter combination serve as a unit to transfer seed from the storage container into the flexible pneumatic line which, at a remote end thereof, is provided with a hand-held discharge device from which the seed is dispensed into the planter or drill boxes. The discharge device has control switches to stop and start the hydraulic motors that power the blower and actuate the lightweight rotary air lock.

The adapter unit is designed to mount on a variety of common-sized openings located at a lower end of a sidewall on a typical storage container. Fasteners are provided to lock the adapter in place over the opening of the storage container. The lightweight rotary air lock is then slidably mounted on the adapter at a predetermined angle which facilitates seed transfer from the seed container into the rotary air lock, and minimizes the chances of seed damage.

Preferably, any hydraulic and electric power required is supplied by means of quick-disconnect couplings at the outlet power supply of a tractor or the like.

Other objects and advantages of the invention will become apparent upon reading the following detailed description and upon reference to the drawings. Throughout the description, like referenced numerals refer to like parts.

BRIEF DESCRIPTION OF THE DRAWINGS

FIG. 1 is a top plan view of a conveyor system constructed in accordance with, and embodying the present invention;

FIG. 2 is an elevational view of the conveyor system illustrated in FIG. 1;

DETAILED DESCRIPTION OF THE PREFERRED EMBODIMENT

Figure 3:
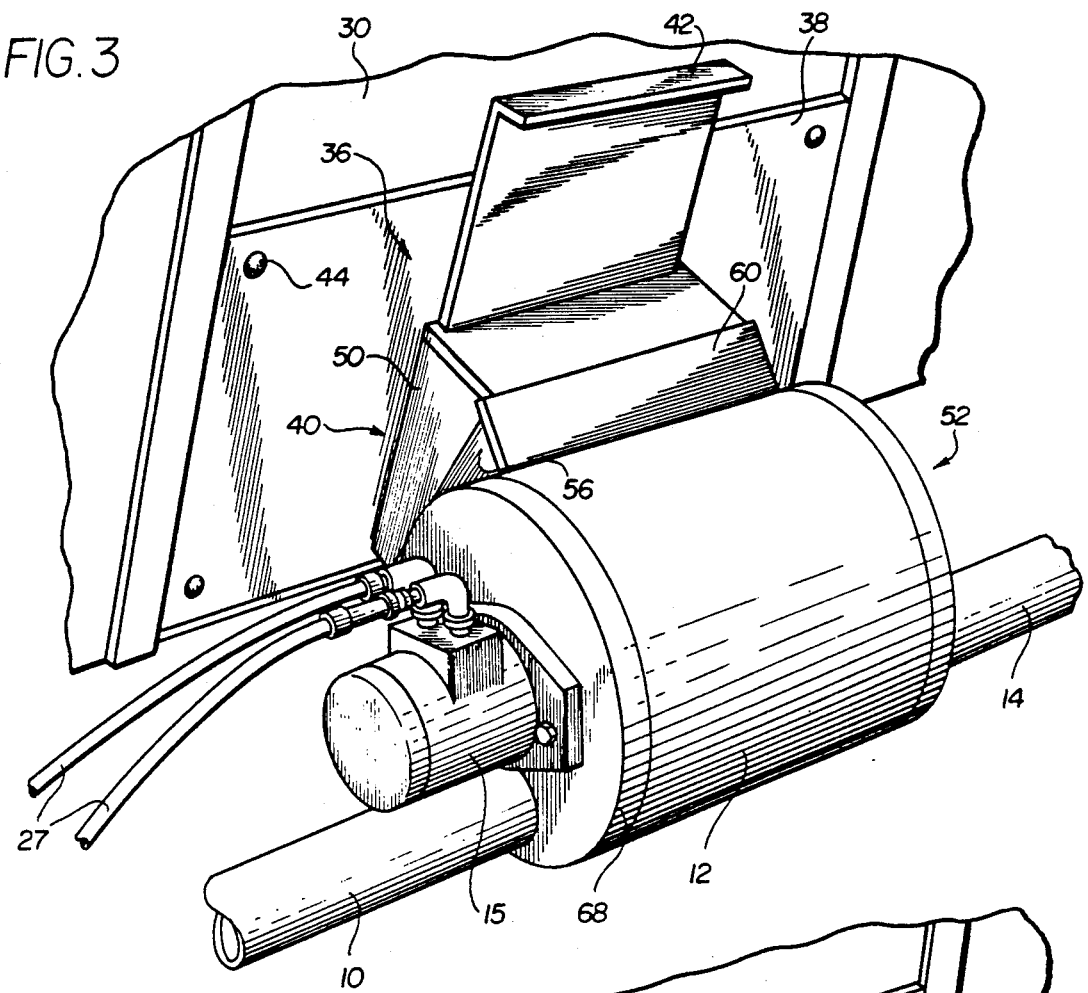
FIG. 3 is an enlarged, isolated, perspective view of the light-weight rotary air lock component and adapter combination shown in operative association with a bulk seed supply container.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Turning now to FIG. 1, there is shown a pneumatic conveyor system comprising a blower 2 that is mounted upon a support plate 4 upon which there is also mounted an upstanding bracket 6 and a manifold 9. Mounted on the bracket 6 is a hydraulic motor 8 which is directly coupled to the blower 2 that includes an intake filter 7. The blower motor 8, and the rotary actuator 15 discussed below, are provided with hydraulic fluid via lines 27 which run between these devices and the manifold 9. Suitable fittings and solenoid valves 11, 13 (FIG. 9) are provided to control the hydraulic fluid supplies at the manifold 9 which are preferably supplied by means of quick-disconnect couplings at the outlet power supply of a tractor. Similarly, electric power required to actuate the solenoid valves 11, 13 is also preferably provided by the tractor supply.

The discharge side of the blower 2 is coupled to a flexible pneumatic tube 10, which extends from the blower 2 to the inlet side of a lightweight rotary air lock 12. The outlet side of the lightweight rotary air lock 12 is connected to another flexible pneumatic tube 14 which is, in turn, connected to the inlet side 16 of a discharge device 18. It is contemplated that the flexible pneumatic tubes 10 and 14 would be relatively long. For example, the length of line 14 might be approximately forty feet.

Figure 8:
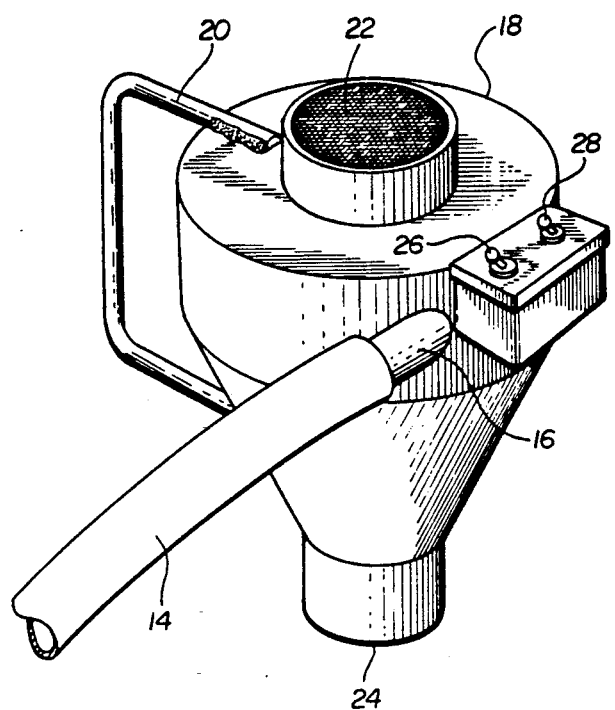
FIG. 8 is an enlarged, isolated, perspective view of the discharge device component of the present invention.

The discharge device 18 is a hand-held cyclone type including a handle 20, as best seen in FIG. 8. The seed material 31 being conveyed in the air stream enters the discharge device 18 at the inlet side 16 thereof, and the seed material 31 is thrown out to the periphery of the device 18 while the air expands to some extent and at the same time separates from the material. The seed material 31 is heavier than the air, and therefore drops downwardly by gravity through a discharge port 24 while the air simultaneously escapes out of the top of the device through a filter 22. Two functions are served by this arrangement. Firstly, the seed material is decelerated thereby minimizing the risk of impact damage to the seed. Secondly, the filter 22 provides a means for the air within the system to escape into the atmosphere. The unit is held by the operator by grasping the handle 20 with one hand, and the inlet side 16 which doubles as a handle in this situation. Seed boxes 23 located on a planter or drill 25, as illustrated in FIGS. 1 and 2, can thus be directly and easily filled by the operator using the discharge device 18. Control switches 26 and 28 are also provided and are readily accessible to the operator gripping the discharge device 18 as described. The switches 26 and 28 control the operation of the rotary air lock 12 and the blower 2 as will be more thoroughly discussed below. Control wires (not shown) run from the switches 26 and 28 along the flexible lines 10 and 14 back to the control valves 11, 13. Alternatively, wireless remote control operation could be provided.

Referring again to FIG. 1 and FIG. 2, a typical storage container 30 is shown, preferably of a size capable of holding approximately 1500 pounds or more of seed material 31. The illustrated container 30 is standard in the industry and is mounted on a running gear 35. Further detail of the construction and design of the container 30 are readily available to one having ordinary skill in the art, and are therefore omitted here.

Typically, the containers are also designed to be relatively moisture-proof, and it is preferred that each container 30 be provided with a sealed cover 34. It should be understood, however, that the present invention is not limited to use with a container 30 as illustrated. Rather, the invention disclosed herein is suitable for use with a variety of seed containers, as should become more easily understood with reference to the following.

Figure 4:
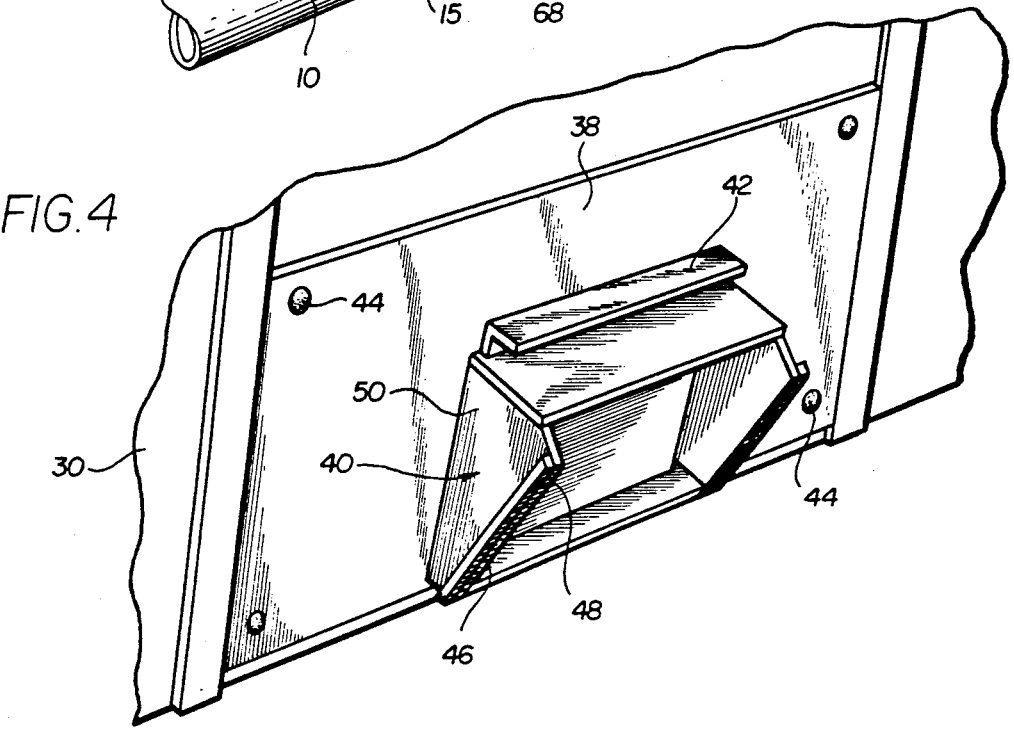
FIG. 4 illustrates the adapter component mounted on the seed supply with the lightweight rotary air lock component removed.

Turning now initially to FIGS. 3 and 4, it can be seen that the lightweight rotary air lock 12 is indirectly mounted on the seed container 30 by use of an adapter component 36. The adapter 36 comprises a back plate 38, and integral chute 40 and a slide gate 42. The back plate 38 is provided with suitable apertures which are fitted with fasteners 44 used to secure the adapter 36 over the outlet hole 32 in the storage container 30.

Typically, the outlet hole 32 and a storage container 30 of this type ranges from a maximum of 47¾" wide to a minimum of 24" wide. The back plate 38 is designed to cover these standard outlet hole sizes and preferably is made to be adjustable (not shown) in width over the size range discussed above so that a single design will accomplish the desired result with any of the standard outlet holes.

Once the adapter 36 is installed, the slide gate 42 will control the seed flow from the storage container 30 by permitting the seed material 31 to flow when in an open position, as illustrated for example in FIG. 3, and preventing seed flow when in a closed position, as illustrated for example in FIG. 4. A close inspection of FIG. 4 also reveals that the chute component 40 of the adapter 36 further comprises a set of rails 46 located along remote edges 48 of chute side walls 50. The rails 46 are fixed at a predetermined angle within the range of 7° to 45° with the back plate 38 to provide for optimum material flow as will be more thoroughly discussed below.

The lightweight rotary air lock 12 is shown to include a substantially cylindrical housing 52 of a predetermined length, preferably fabricated from plastic and having an upstanding mating flange 54 which extends substantially the length of the substantially cylindrical housing 52, and defines an opening in the housing 52 thereby providing access to the interior, as illustrated. The flange portion 54 has two side walls 56 which include grooves 58 (FIG. 5) designed to mate with the rails 46 of the adapter 36. The flange 54 further includes a back wall 60 which engages the adapter 36 after the grooves 58 of the flange 54 have been slid completely on to the rails 46 of the adapter 36, as best shown in FIG. 3. Consequently, the rotary air lock 12 is held in place by gravity or fastened by a suitable mechanism (not shown) at a predetermined angle with respect to the adapter 36.

Figure 5:
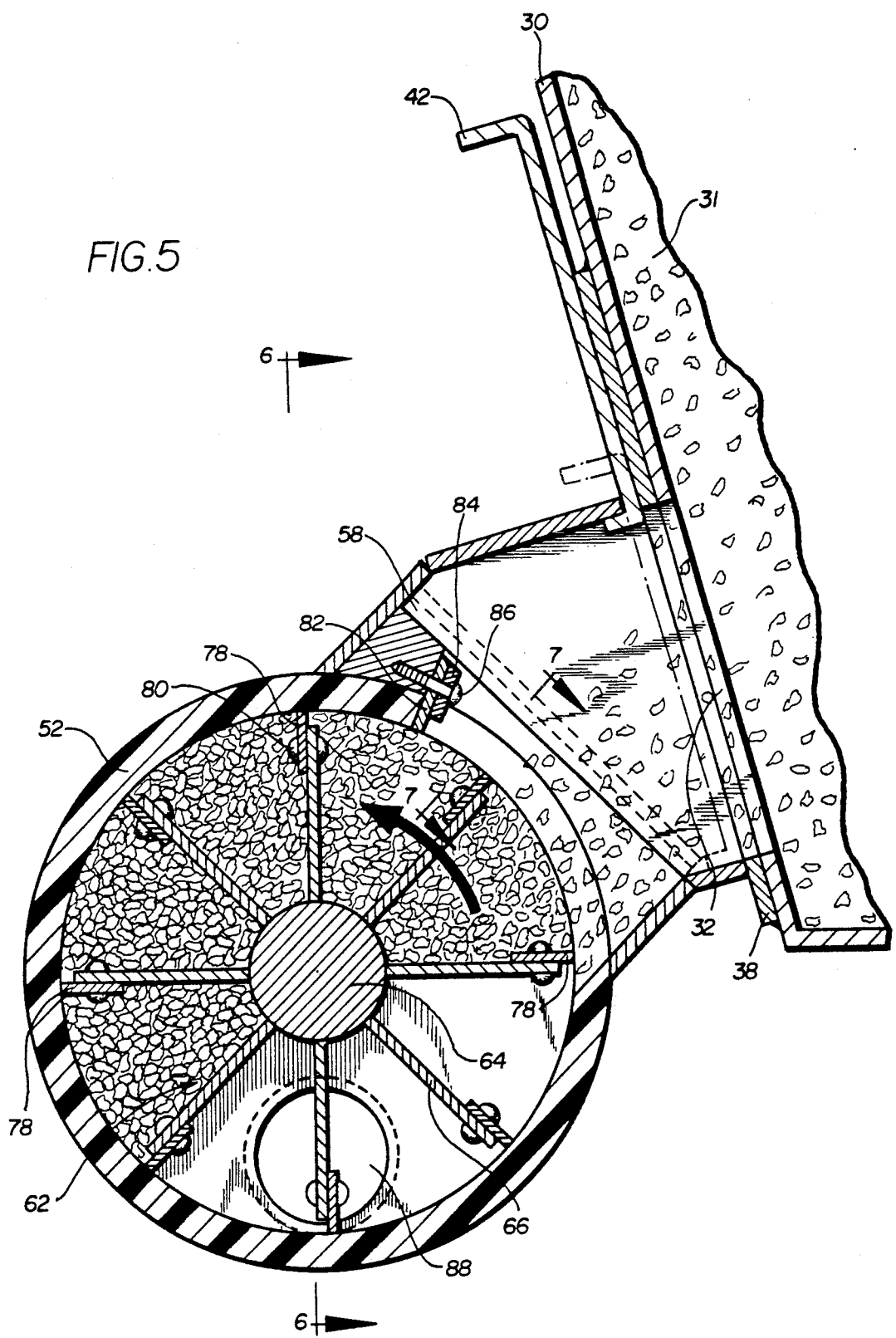
FIG. 5 is a sectional view taken along line 5—5 of FIG. 2.
Figure 6:
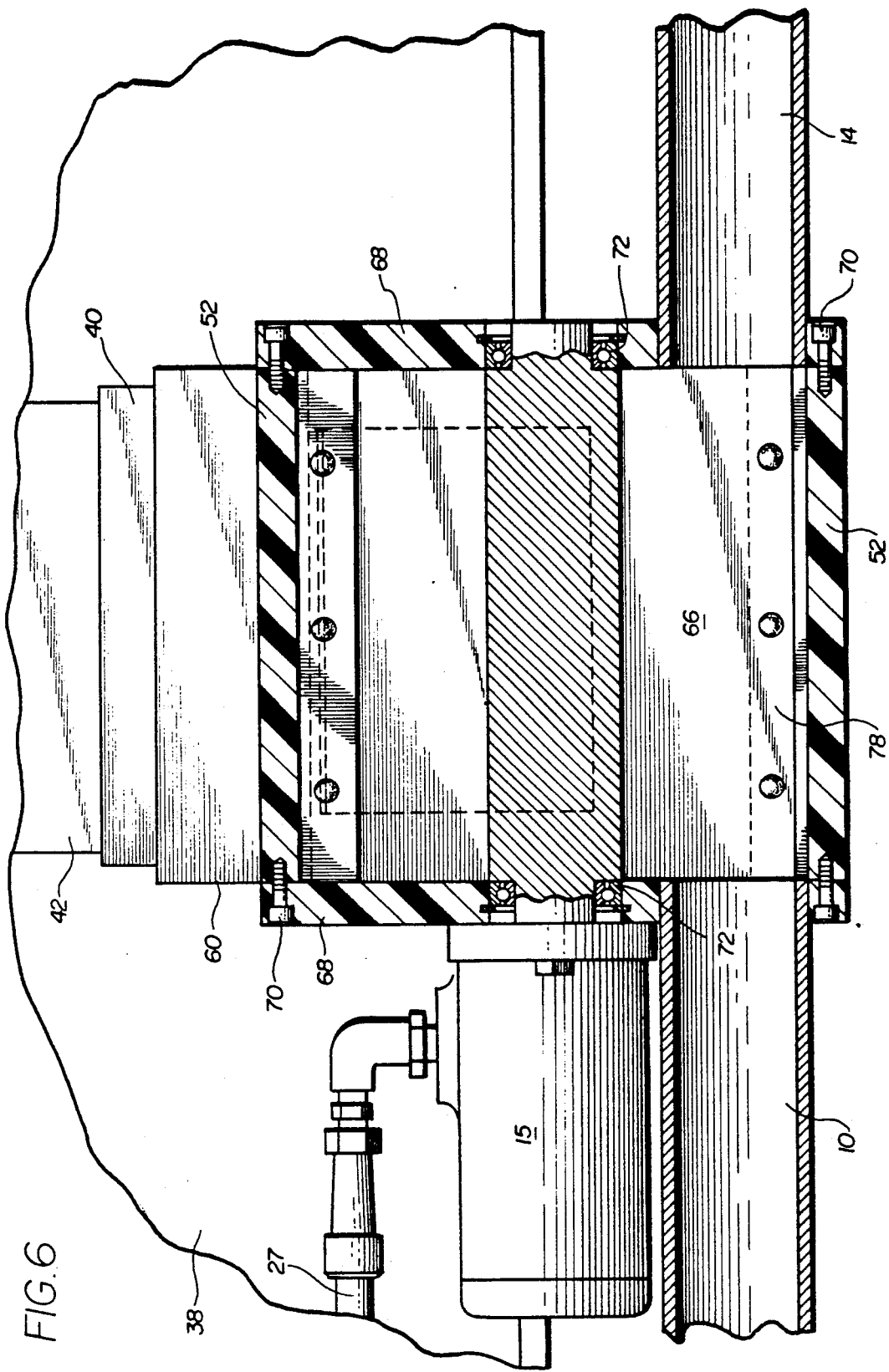
FIG. 6 is a sectional view taken along line 6—6 of FIG. 5.
Figure 7:
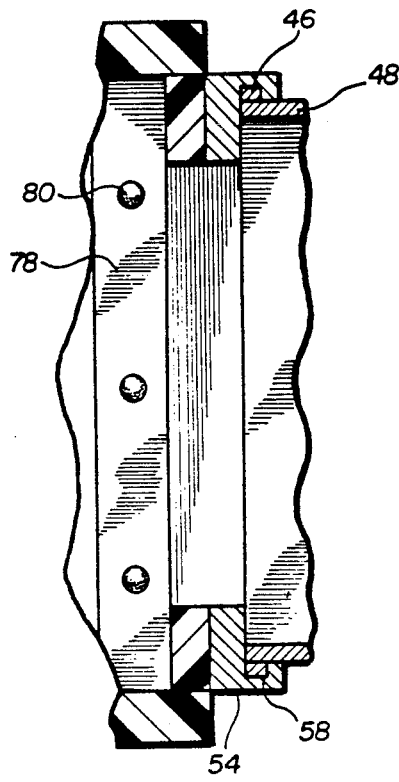
FIG. 7 is a sectional view taken along line 7—7 of FIG. 5.

Referring now to FIGS. 5–7, the rotary air lock 12 is shown to include a multi-vaned rotor 62 having a shaft 64 and radially extending rotor vanes 66 mounted thereon. The preferably steel shaft 64 is directly coupled to the shaft of a rotary actuator 15 fastened to one of a pair of plastic end bells 68 which are bolted to the ends of the housing 52 with bolts 70. Bearings 72 rotatably support the shaft 64 as shown in FIG. 6. As mentioned above, hydraulic fluid is provided to the rotary actuator 15 via flexible lines 27.

The rotor vanes 66 are preferably fabricated from aluminum, and can be attached to the shaft 64 in any of several manners, such as by securing a plastic vane holder (not shown) to the shaft and then gluing the vanes thereto. Rotor blades 66 further preferably include steel blade tips 78 adjustably mounted on the vane edges away from the shaft 64 as best seen in FIG. 5. Fasteners 80 allow for wear adjustment of the blade tips 78 as further discussed below. Upon revolution of the rotor, the blade tips 78 come into contact with a wiper blade 82 mounted on a support bracket 84 with bolts 86, the function of which will become apparent.

Finally with respect to the housing 52, apertures 88 suitable to receive tubes 10, 14 are formed in the end bells 68 at a location remote from the flange 54. It should be obvious to one of skill in the art that the exact location and design of the apertures 88 is not limited to those illustrated. For example, the apertures 88 could be diametrically opposed from the flange 54, and be in the form of tubular sections extending outward from the end bells 68 designed to mate with the tubes 10, 14 through the use of suitable couplings.

In operation, the lightweight rotary air lock 12 is quickly and easily slide-mounted on the adapter 36, which has previously been fastened to the seed container 30 as discussed above. Slide gate 42 should then be raised to the position desired, which will depend upon the particular flow characteristics of seed material being transported, thereby allowing seed 31 to enter the housing 52. Once the operator has positioned the discharge device 18 over the seed box 23 to be filled, control switches 26 and 28 can then be used to activate the blower motor 8 and the rotary actuator 15. As a result of the rotary air lock 12 being held at a fixed angle by the adapter 36 as discussed above, the seed material 31 entering the housing falls upon upturned pockets between the rotor vanes 66 thereby promoting a substantially complete fill of the rotor 62 and simultaneously minimizing the likelihood of trapping seed material between the blade tips 78 and housing 52. It should be noted that the angle at which the rotary air lock 12 is held in relation to the seed container 30, as noted above, can be selected within the range between 7° and 45° according to the angle of repose of the seed material with which the rotary air lock 12 is being used. Seed material 31 is next carried around the housing 52 until reaching the point in rotation at which apertures 88 meet inlet and outlet tubes 10 and 14. The air pressure in the inlet tube 10 created by the blower 2, forces the seed material 31 out of the pockets between the vanes 66 and into the outlet tube 14, and eventually onward to the discharge device 18. Introduction of the seed material 31 into the air stream carried by inlet tube 10 and outlet tube 14 results in an acceptable pressure reduction within the line thus allowing the seed material to be effectively carried forward to the discharge device 18.

It should be noted that the lightweight rotary air lock 12, as discussed, is driven by a hydraulic actuator 15. Power to the rotor 62, however, could also be provided by several other means, such as a chain or belt drive, details on the arrangement of which would be readily available to one of ordinary skill in the art.

During rotation of the lightweight rotary air lock 12, wiper blade 82 (best illustrated in FIG. 5) cleans each blade tip 78 just prior to entering the portion of rotation wherein the seed material 31 is carried downward through the housing 52 toward the apertures 88. The objective throughout the design is to preclude subjecting the seed material 31 to a shear position between the blade tip 78 and the housing 52 thereby significantly reducing seed damage. To this end, seed likely to be caught in such a shear position is wiped back into the trailing pocket. Adjustment of the blade tips 78 to come within a close tolerance of the housing 52 is in furtherance of the same objective.

With proper operation and adjustment, the lightweight rotary air lock 12 of the present invention can move seed with minimal damage. The lightweight rotary air lock 12 weighs just 55 pounds and is therefore also easily transportable from one container 30 to another, and represents a significant advancement over prior rotary air lock devices which weighed several hundred pounds.

Figure 9:
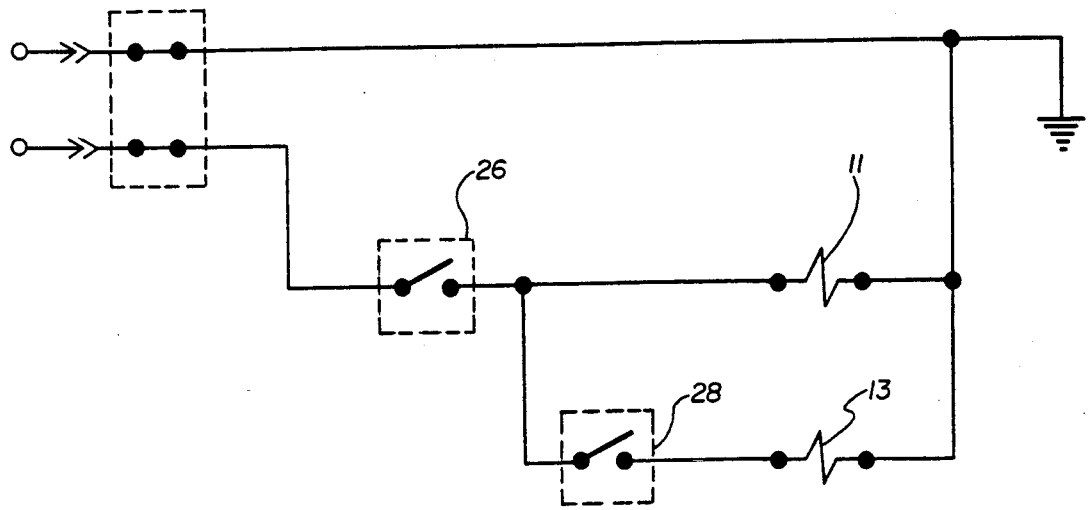
FIG. 9 is a schematic view of a typical electrical installation utilized in conjunction with the conveying system of the present invention.

A wiring schematic for the switches 26, 28 and the solenoid valves 11, 13 is illustrated in FIG. 9.

While a preferred embodiment of the unique combination of the present invention is shown and described, it is envisioned that those skilled in the art may devise various modifications of the present invention without departing from the spirit and scope of the appended claims. The invention is not intended to be limited by the foregoing disclosure, but only by the following appended claims.

The invention is claimed as follows:

1. A pneumatic conveyor system for seeds comprising:
   a. air supply means for providing an air flow;
   b. conduit means coupled to said air supply means for directing said air flow and carrying said seeds along a path traveled by said conduit means, said conduit means having a predetermined length and being flexible over a major portion of its length;
   c. portable transfer means disposed in said conduit means for accepting seeds from a bulk storage container and for introducing said seeds into the conduit means, and;
   d. a discharge device coupled to said conduit means at a location remote from said air supply means for receiving and discharging the seeds introduced into the conduit means by the portable transfer means, and for causing the formation of a vortex tat separates the air from the seeds being conveyed, wherein:

e. said portable transfer means comprises a lightweight, portable rotary air lock having a multi-vaned rotor for introducing the seeds into said conduit means, and;

f. an adapter means including rails for slidably engaging grooves formed in a housing surrounding said lightweight rotary air lock is provided for removably mounting said lightweight, portable rotary air lock to said bulk container and for holding said rotary air lock at a predetermined angle with respect to the vertical axis of said bulk storage container to promote the complete filling of said multi-vaned rotor, and to minimize the risk of shearing damage to the seeds entering the portable transfer means.

2. A pneumatic conveyor as recited in claim 1, wherein said lightweight rotary air lock further includes a wiper blade mounted in said housing in operative association with said multi-vaned rotor such that an outer edge of each vane of said multi-vaned rotor is wiped clean by said wiper blade prior to the point in the rotation of said multi-vaned rotor at which seed is subjected to the possibility of shearing damage by entrapment between said outer edge of each vane and said housing.

3. A pneumatic conveyor as recited in claim 2, wherein said multi-vaned rotor includes rotor vanes with adjustable outer edges for minimizing the risk of damaging the seed passing through said lightweight rotary air lock upon wear of the vane outer edges.

* * * * *